Figure 1:
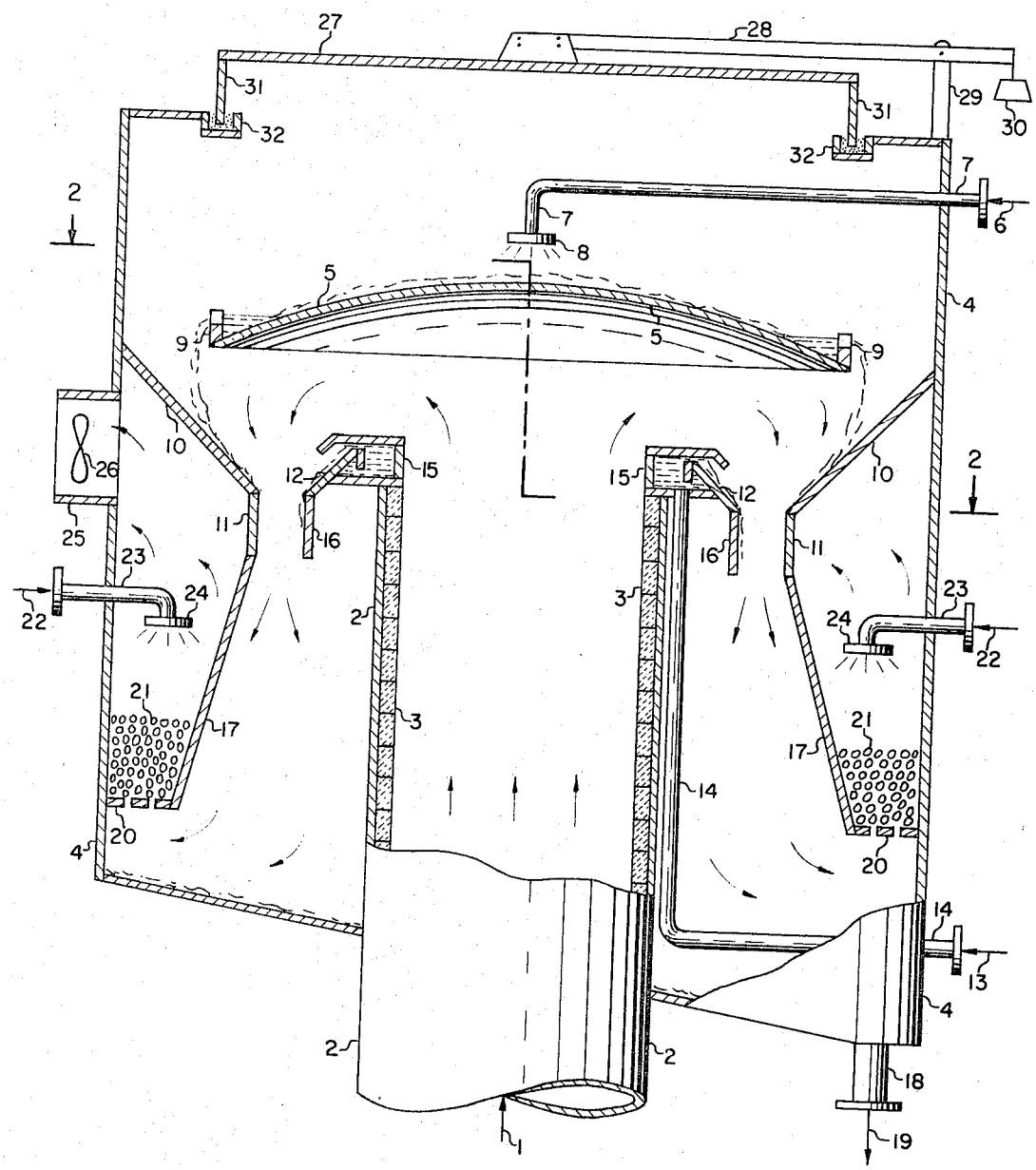

May 2, 1967 L. A. LOHNER ET AL 3,317,197
STACK MOUNTED SCRUBBER
Filed June 22, 1966 2 Sheets-Sheet 1

LOUIS A. LOHNER
PETER M. WECHSELBLATT
INVENTORS.

BY J. T. Chaboty
AGENT

May 2, 1967 L. A. LOHNER ET AL 3,317,197
STACK MOUNTED SCRUBBER
Filed June 22, 1966 2 Sheets-Sheet 2

LOUIS A. LOHNER
PETER M. WECHSELBLATT
INVENTORS

BY J. T. Chaboty,
AGENT

United States Patent Office

3,317,197
Patented May 2, 1967

3,317,197
STACK MOUNTED SCRUBBER
Louis A. Lohner, Maspeth, and Peter M. Wechselblatt, New York, N.Y., assignors to Chemical Construction Corporation, New York, N.Y., a corporation of Delaware
Filed June 22, 1966, Ser. No. 559,510
14 Claims. (Cl. 261—24)

The present invention relates to the quenching and scrubbing of a hot gas stream being discharged from a stack, and provides an improved apparatus for the quench-scrubbing of a hot gas stream to remove entrained solid particles, mist and vapors, in which the apparatus is mounted directly at the stack outlet. Thus, the apparatus is applicable to existing stacks as well as new facilities.

Numerous industrial or commercial facilities discharge hot gas streams laden with entrained solids, mists and vapors to the atmosphere. Among these may be mentioned iron cupola furnaces, incinerators, steam-electric power plants, oxygen steel converters, sulfide ore roasters, and black liquor furnaces in sulfate pulp facilities. The entrained solids in the hot discharge gas stream may consist of soot, fly ash, iron oxide particles or various types of dust. In many instances, particularly in older existing facilities, the hot gas stream is directly discharged to the atmosphere through a stack, which serves to disperse the entrained solids, sparks or mists and vapors into the upper atmosphere and thus prevents localized fallout of these contaminants in the surounding area. In recent years, however, more stringent air pollution regulations have been enacted in many communities, which have necessitated the provision of adequate facilities or apparatus for treating the stack gases so as to remove entrained contaminants and prevent air pollution. In many instances, the installation of conventional devices such as bag filters is not warranted due to the cost of such facilities, and a simple and effective device for saturating and scrubbing the hot gas emission from existing stacks has heretofore not been developed.

Numerous devices have been provided in the prior art for the wet scrubbing of gas streams to remove entrained solid particles. These various devices, such as the apparatus assemblages dislosed in U.S. Patents Nos. 3,077714 and 3,085,793 and Canadian Patents Nos. 684,884 and 670,150, are generally not suitable for direct mounting on an existing stcak, and necessitate the provision of auxiliary facilities at ground level, as well as the installation of ancillary ductwork and various appurtenances. The various devices suggested in the prior art for direct installation in or adjacent to existing stacks, such as those of U.S. Patents Nos. 2,937,013 and 3,212,761 and U.S. patent application No. 322,351 filed November 8, 1963, and now Patent No. 3,262,685, are relatively ineffective in terms of securing satisfactory or total removal of entrained solid particles from stack gases.

In the present invention, an improved apparatus is provided for the quenching and scrubbing of a hot gas emitted by a stack. A concentric cylindrical container is provided about the upper outlet end of the stack, and a substantially horizontal wetted baffle is provided within the container and above the stack outlet. The horizontal baffle serves to deflect the emitted gas outwards and downwards in the annular passage between the stack and the container wall, which is provided with a gas accelerating and scrubbing section consisting of converging frusto-conical baffles from which cylindrical baffles depend vertically downwards, so as to form an annular venturi scrubbing passage. Two liquid streams are provided. One stream flows over the upper surface of the horizontal baffle and is thereafter projected onto the surface of the outer inverted frusto-conical baffle, while the other stream flows as a thin liquid film over the upper surface of the inner upright frusto-conical baffle. The liquid streams are thus projected into the annular venturi scrubbing passage defined by the vertical cylindrical baffles. After subsequent gradual enlargement of the gas flow path by the provision of a downwardly depending upright frusto-conical baffle below the outer cylindrical baffle, the gas stream is preferably further scrubbed and entrained liquid droplets are removed by providing a bed of packing in the annular space between the downwardly depending frusto-conical baffle and the container, with a third liquid stream being passed into the bed of packing. The quenched and scrubbed gas stream is removed from the container below the outer inverted frusto-conical baffle, and above the packing bed in instances when this apparatus element is provided. Residual unvaporized liquid is removed from the lower end of the container, and contains entrained contaminants derived from the gas stream.

The apparatus of the present invention provides several important advantages. The device saturates and scrubs the gas emission from any stack. Because of the design configuration, the scrubber can frequently be mounted directly on the stack requiring no additional supports. The scrubber tends to be smaller in size and weight than existing units. The unit is so arranged that no hot areas exist, since all of the scrubbing tends to be of a wet wall design. Finally, because of the elimination of a hot section of lined duct, all duct work becomes smaller and lighter.

It is an object of the present invention to provide an improved apparatus for the quenching and scrubbing of a hot contaminated gas stream emitted by a stack.

Another object is to provide an apparatus for quenching and scrubbing a stack gas which is mounted directly on the stack outlet.

A further object is to provide an apparatus for scrubbing a stack gas which is relatively simple, readily fabricated and light in weight.

An additional object is to remove entrained solids or other contaminants from a stack gas in an improved manner.

Still another object is to provide an appartus for diverting a stack gas downwardly into an annular venturi scrubbing apparatus.

Still a further object is to provide an apparatus for the quenching and scrubbing of hot stack gas containing entrained solid particles and other contaminants, in which no hot areas exist and gas-liquid contact is attained by wetted wall design.

These and other objects and advantages of the present invention will become evident from the description which follows. Referring to the figures, FIGURE 1 is a sectional elevation view of a preferred embodiment of the apparatus, and FIGURE 2 is a sectional plan view of FIGURE 1, taken on section 2—2.

Figure 2:
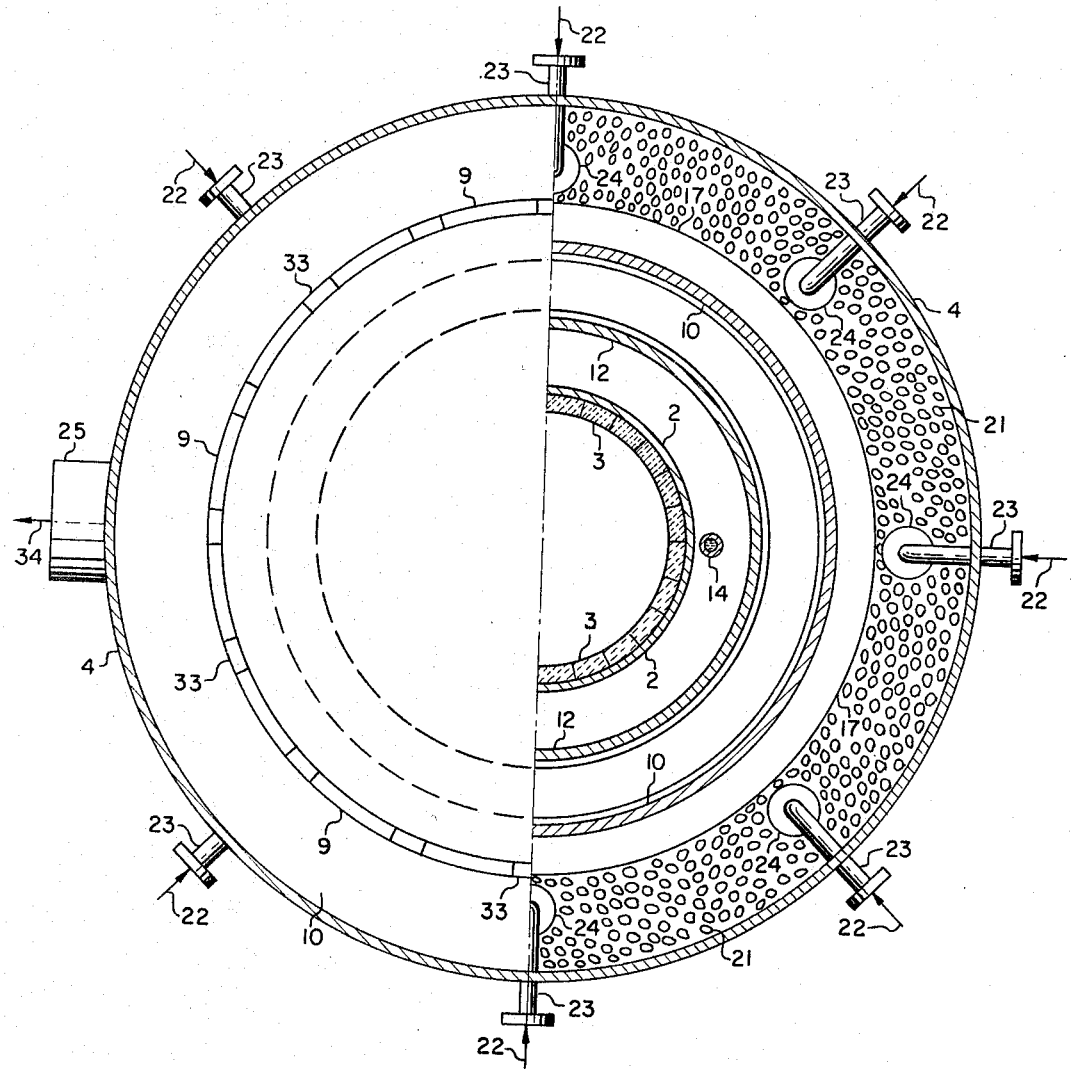

Referring now to FIGURE 1, the hot gas stream 1 discharged from a facility such as those mentioned supra and containing entrained contaminants is passed upwards through vertical stack 2 which is provided with internal refractory lining 3. The stack 2 is of generally cylindrical configuration, and is vertically oriented with an upper outlet terminus. In many instances, the stack 2 will be a previously installed facility, with which the other apparatus elements of the present invention are combined.

The vertically oriented cylindrical container 4 is disposed about the upper outlet end of the stack 2. Unit 4 is coaxial with stack 2 and is concentrically external to the upper end of the stack, extending from below the stack outlet to an upper terminus spaced above the stack outlet. In most instances container 4 will be directly mounted on and supported by stack 2. A circular generally horizontal baffle 5 is centrally disposed in the upper part of container 4 above the upper outlet of stack 2. Baffle 5 is supported by cables or rods, not shown, which extend to the wall of container 4. The baffle 5 is shown in a preferred configuration, as an arcuate unit in cross-section with the center of baffle 5 being at highest elevation. In other instances unit 5 may be totally flat and uniformly horizontal, or unit 5 may be in the form of a flat cone. The baffle 5 is of larger diameter than the stack 2, so that the rising hot gas stream is diverted downwards and outwards by baffle 5. A first liquid stream 6, which will generally consist of water, is passed via conduit 7 and distribution or spray nozzle onto the center of the upper surface of baffle 5, and flows across the upper surface of unit 5 thus providing a cooling effect. A weir 9 is provided about the periphery of baffle 5, and in most instances weir 9 will be notched, so as to provide a uniform distribution of the liquid flowing over the edge of baffle 5. The notches in weir 9 may be square, serrated or of other suitable form.

The liquid flowing downwards from weir 9 next flows onto the upper surface of the outer inverted frusto-conical baffle 10, which extends downwards and inwards from the wall of container 4 and terminates below and external to the stack outlet. The liquid flows down the surface of baffle 10 as a uniformly distributed film. A first vertical cylindrical baffle 11 depends downward from the lower end of baffle 10.

A first upright frusto-conical baffle 12 is provided opposite to baffle 10. A second liquid stream 13, which will generally consist of water, is passed via conduit 14 to distribution channel 15 disposed about the upper edge of stack 2. This channel 15 may also be located around the periphery of stack 2. The liquid flows uniformly from channel 15 onto the upper surface of baffle 12, and flows down the surface of baffle 12 as a uniformly distributed film. A second vertical cylindrical baffle 16 depends downward from the lower end of baffle 12 and parallel with baffle 11, so as to provide an annular passage of restricted cross-section between baffles 11 and 16. The combination of baffles 10, 12, 11 and 16 serves to provide an annular venturi-type passage, and the hot gas discharged from stack 2 is directed by baffle 5 into this passage, with resultant acceleration of the gas stream. The downflowing liquid films on baffles 10 and 12 are projected into the throat section of the annular venturi defined between baffles 11 and 16, and a dispersion of the liquid into the gas stream takes place, with resultant quenching and scrubbing of the gas stream being accomplished.

The gas-liquid mixture discharged from the passage between baffles 11 and 16 next flows into an annular expansion passage in which separation of liquid containing separated solids from the cleaned gas stream takes place. This expansion passage is defined between the second upright frusto-conical baffle 17 which depends downwards and outwards from the lower end of baffle 11, and the outer wall of stack 2. The cleaned gas stream next passes upwards between baffle 17 and the wall of container 4 for discharge, and in some instances the gas stream will now be suitable for discharge from container 4 to the atmosphere or to an additional process via an outlet from container 4 below baffle 10. Separated residual liquid flows across the inclined bottom of container 4, and is discharged via nozzle 18 as stream 19, which contains solids removed from stream 1.

In most instances, further gas-liquid contact is provided in the apparatus, in order to effect separation of entrained liquid droplets and a minor further removal of residual contaminants from the gas stream. The gas stream thus flows outwards below baffle 17, which terminates within container 4, and then flows upwards through the annular foraminous support grid 20, and into packing bed 21. Bed 21 is provided with suitable packing such as spheres, Raschig rings, sieve trays, or other means for attaining extensive gas-liquid contact, and gas-liquid contact is attained within bed 21, with liquid streams 22 usually consisting of water being passed via conduits 23 to spray nozzles 24 and being dispersed downwards in bed 21. Removal of residual entrained liquid droplets and solid particles is attained in bed 21, with the resultant liquid flowing to the bottom of container 4 for discharge via stream 19. The final gas stream rising from bed 21 now passes to discharge via outlet conduit 25, which extends from the wall of container 4 below baffle 10 and is preferably provided with a gas discharge fan 26.

In most instances, a pressure responsive gas outlet means will be provided in the upper end of container 4, in order to accommodate for surges of increased stack gas pressure by direct discharge of the stack gas to atmosphere. This gas outlet means will typically consist of the movable cover 27, which is attached to support bar 28. The bar 28 is pivoted by support member 29 and counterweight 30 is attached to bar 28 opposite cover 27. The cover 27 is provided with suitable detachable gas sealing means which cooperate with container 4, thus the outer rim of cover 27 is provided with a downward extension 31 which extends into the sand-filled trough 32. Upon any sudden increase in the pressure within container 4, the cover 27 rises to release excess stack gas. When the excess gas pressure terminates, the cover 27 returns to its normal sealing position.

FIGURE 2 is a sectional view of the apparatus, and shows the concentric circular nature of the appartus elements, as well as the weir notches 33 and the discharged fully cleaned and quenched gas stream 34.

Numerous alternatives within the scope of the present invention will occur to those skilled in the art, besides those mentioned supra. Thus, the notches in weir 9 may be omitted in some instances, and weir 9 itself may be omitted in cases where a large uniform flow of liquid is maintained by distributor 8 over the surface of baffle 5. The distributor 8 may consist of a plurality of nozzles or pipe elbows extending from conduit 7, and a whirling circular flow of liquid may thus be provided over the upper surface of baffle 5. Liquid streams 6, 13 and 22 may consist of water or other suitable liquid. In instances when stream 1 consists of a stack gas containing sulfur dioxide, streams 6, 13 and 22 may consist of a basic solution such as an aqueous ammoniacal solution or an aqueous alkali carbonate solution, in order to effect a partial removal of sulfur dioxide from the gas stream. Inwardly extending horizontal lips, not shown, may be provided at the lower terminus of the inverted frusto-conical baffle 10 and frusto-conical baffle 12, in order to more effectively project the downflowing liquid films into the accelerated gas stream. In some instances it will be feasible and desirable to provide an inverted frusto-conical baffle, not shown, depending downward and inward from the lower end of baffle 16, in order to reduce turbulence and gas pressure drop. This baffle would then terminate adjacent to the wall of stack 2. In instances when hot gas stream 1 is available with sufficient pressure head, the fan 26 and its function may be omitted. Finally, cover 27 and its appurtenances and function may be omitted in instances when stream 1 is provided at substantially constant pressure. In this case, container 1 would be a totally closed and gas-tight unit with the exception of gas discharge conduit 25 and liquid discharge nozzle 18. Stream 22 may be used intermittently for flushing packing bed 21 clean when only mist elimination is desired.

We claim:
1. An apparatus for quenching and scrubbing a hot contaminated gas stream which comprises a vertically oriented cylindrical stack, said stack extending upwards from a source of hot contaminated gas, a vertically oriented cylindrical container, said container being coaxial with and concentrically external to said stack and extending from below the stack outlet to an upper terminus spaced above the stack outlet, a circular generally horizontal baffle, said baffle being centrally disposed within said container above the stack outlet and being of larger diameter than said stack, an inverted frusto-conical baffle, said inverted baffle extending downwards and inwards from the inner wall of said container and terminating below and external to the stack outlet, a first upright frusto-conical baffle, said first upright baffle extending downwards and outwards from the stack outlet and terminating adjacent to the lower end of said inverted frusto-conical baffle, a first vertical cylindrical baffle, said first cylindrical baffle depending downwards from the lower end of said inverted fursto-conical baffle, a second vertical cylindrical baffle, said second vertical cylindrical baffle depending downwards from the lower end of said first upright frusto-conical baffle and parallel with said first vertical cylindrical baffle, whereby an annular passage of restricted cross-section is defined between said first and second vertical cylindrical baffles, a second upright frusto-conical baffle, said second upright baffle extending downwards and outwards from the lower end of said first vertical cylindrical baffle and terminating within said container, means to discharge a first liquid stream onto the upper surface of said horizontal baffle, whereby liquid flows over the circular edge of said horizontal baffle and is projected downwards onto the upper surface of said inverted frusto-conical baffle, and thereby flows downwards into said annular passage, means to pass a second liquid stream onto the upper surface of said first upright frusto-conical baffle as a uniform liquid film, whereby said second liquid stream flows downwards into said annular passage, means to remove quenched and scrubbed stack gas from said container below the upper end of said inverted frusto-conical baffle, and means to remove excess unvaporized liquid from the lower end of said container.

2. The apparatus of claim 1, in which said horizontal baffle is provided with a weir about its periphery.

3. The apparatus of claim 2, in which the upper edge of said weir is provided with a plurality of notches.

4. The apparatus of claim 1, in which said generally horizontal baffle is arcuate with the center of said baffle being at highest elevation, and said first liquid stream is discharged at the center of said baffle.

5. The apparatus of claim 1, in which said first and second liquid streams comprise water.

6. The apparatus of claim 1, in which the upper end of said container is provided with pressure-responsive gas outlet means, whereby a large increase in stack gas pressure is compensated by direct discharge of stack gas to atmosphere.

7. The apparatus of claim 1, in which said means to remove quenched and scrubbed stack gas from said container comprises a conduit provided with a gas discharge fan.

8. An apparatus for quenching and scrubbing a hot contaminated gas stream which comprises a vertically oriented cylindrical stack, said stack extending upwards from a source of hot contaminated gas, a vertically oriented cylindrical container, said container being coaxial with and concentrically external to said stack and extending from below the stack outlet to an upper terminus spaced above the stack outlet, a circular generally horizontal baffle, said baffle being centrally disposed within said container above the stack outlet and being of larger diameter than said stack, an inverted frusto-conical baffle, said inverted baffle extending downwards and inwards from the inner wall of said container and terminating below and external to the stack outlet, a first upright frusto-conical baffle, said first baffle extending downwards and outwards from the stack outlet and terminating adjacent to the lower end of said inverted baffle, a first vertical cylindrical baffle, said first cylindrical baffle depending downwards from the lower end of said inverted frusto-conical baffle, a second vertical cylindrical baffle, said second vertical cylindrical baffle depending downwards from the lower end of said first upright frusto-conical baffle and parallel with said first vertical cylindrical baffle, whereby an annular passage of restricted cross-section is defined between said first and second vertical cylindrical baffles, a second upright frusto-conical baffle, said second upright baffle extending downwards and outwards from the lower end of said first vertical cylindrical baffle and terminating within said container, a bed of packing, said packing being being disposed in the annular space between said second upright frusto-conical baffle and said container, foraminous means to support said packing bed, said foraminous support means extending substantially horiozntally below said packing bed and between said second upright baffle and said container, means to discharge a first liquid stream onto the upper surface of said horizontal baffle, whereby liquid flows over the circular edge of said horizontal baffle and is projected downwards onto the upper surface of said inverted frusto-conical baffle, and thereby flows downwards into said annular passage, means to pass a second liquid stream onto the upper surface of said first upright frusto-conical baffle as a uniform liquid film, whereby said second liquid stream flows downwards into said annular passage, means to discharge a third liquid stream into said packing bed, whereby further gas scrubbing and the removal of entrained liquid droplets from the gas stream is attained, means to remove quenched and scrubbed stack gas from said container between the top of said packing bed and the upper end of said inverted frusto-conical baffle, and means to remove excess unvaporized liquid from said container below said foraminous support means.

9. The apparatus of claim 8, in which said horizontal baffle is provided with a weir about its periphery.

10. The apparatus of claim 9, in which the upper edge of said weir is provided with a plurality of notches.

11. The apparatus of claim 8, in which said generally horizontal baffle is arcuate with the center of said baffle being at highest elevation, and said first liquid stream is discharged at the center of said baffle.

12. The apparatus of claim 8, in which said first, second and third liquid streams comprise water.

13. The apparatus of claim 8, in which the upper end of said container is provided with pressure-responsive gas outlet means, whereby a large increase in stack gas pressure is compensated by direct discharge of stack gas to atmosphere.

14. The apparatus of claim 8, in which said means to remove quenched and scrubbed stack gas from said container comprises a conduit provided with a gas discharge fan.

References Cited by the Examiner

UNITED STATES PATENTS

| | | | |
|---|---|---|---|
| 1,171,750 | 2/1916 | Kaan et al. | 261—112 |
| 2,937,013 | 5/1960 | Fisher | 261—116 X |
| 3,085,793 | 4/1963 | Pike et al. | |

HARRY B. THORNTON, *Primary Examiner.*

T. R. MILES, *Assistant Examiner.*